United States Patent [19]

Girardin

[11] Patent Number: 5,396,040
[45] Date of Patent: Mar. 7, 1995

[54] DEVICE, STANDARD BLANKS AND STANDARDIZED ELECTRODES FOR ELECTRO-DISCHARGE MILLING

[75] Inventor: Roger Girardin, Vernier, Switzerland

[73] Assignee: Charmilles Technologies S.A., Meyrin, Switzerland

[21] Appl. No.: 675,903

[22] PCT Filed: Jul. 5, 1990

[86] PCT No.: PCT/CH90/00163

§ 371 Date: May 13, 1991

§ 102(e) Date: May 13, 1991

[87] PCT Pub. No.: WO91/00791

PCT Pub. Date: Jan. 24, 1991

[30] Foreign Application Priority Data

Jul. 13, 1989 [CH] Switzerland .......................... 2622/89

[51] Int. Cl.[6] .............................................. B23H 1/04
[52] U.S. Cl. .................. 219/69.15; 219/69.16; 219/69.2
[58] Field of Search ............... 219/69.15, 69.16, 69.17, 219/69.2, 69.13

[56] References Cited

U.S. PATENT DOCUMENTS

| | | | |
|---|---|---|---|
| 3,122,628 | 2/1964 | Inoue | 219/69.2 |
| 3,398,253 | 8/1968 | Rye | 219/69.17 |
| 4,754,115 | 6/1988 | Rhoades | 219/69.15 |
| 4,764,653 | 8/1988 | Bühler | 219/69.15 |
| 4,827,213 | 5/1989 | Spaude | 219/69.16 |
| 4,859,824 | 8/1989 | Ukaji et al. | 219/69.15 |
| 4,891,485 | 1/1990 | Briffod | 219/69.15 |
| 5,038,012 | 8/1991 | Walter | 219/69.15 |
| 5,049,715 | 9/1991 | Tanaka | 219/69.15 |
| 5,091,622 | 2/1992 | Ohba | 219/69.15 |

*Primary Examiner*—Geoffrey S. Evans
*Attorney, Agent, or Firm*—Gifford, Krass, Groh, Sprinkle, Patmore, Anderson and Citkowski

[57] ABSTRACT

An electric discharge machine with a turning or touch-up of the electrode uses an auxiliary tool for cutting or chiseling within an auxiliary tool holder which is mounted in the tank and includes a reference sphere for determining the electrode's shape. The auxiliary tool can include an assembly of several mechanical tools mounted symmetrically.

19 Claims, 6 Drawing Sheets

  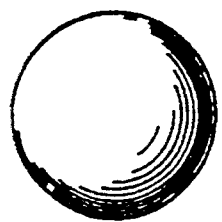 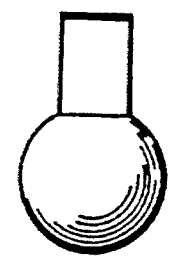
FIG.1a    FIG.1b    FIG.1c    FIG.1d
 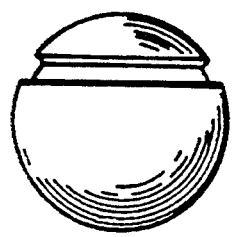 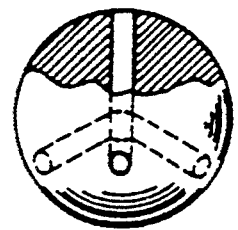
FIG.1e    FIG.1f    FIG.1g
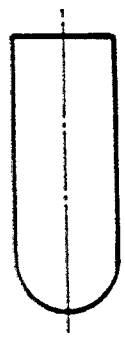 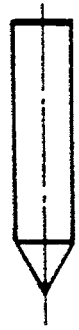  
FIG.1h    FIG.1i    FIG.1j    FIG.1k
 
FIG.1l    FIG.1m

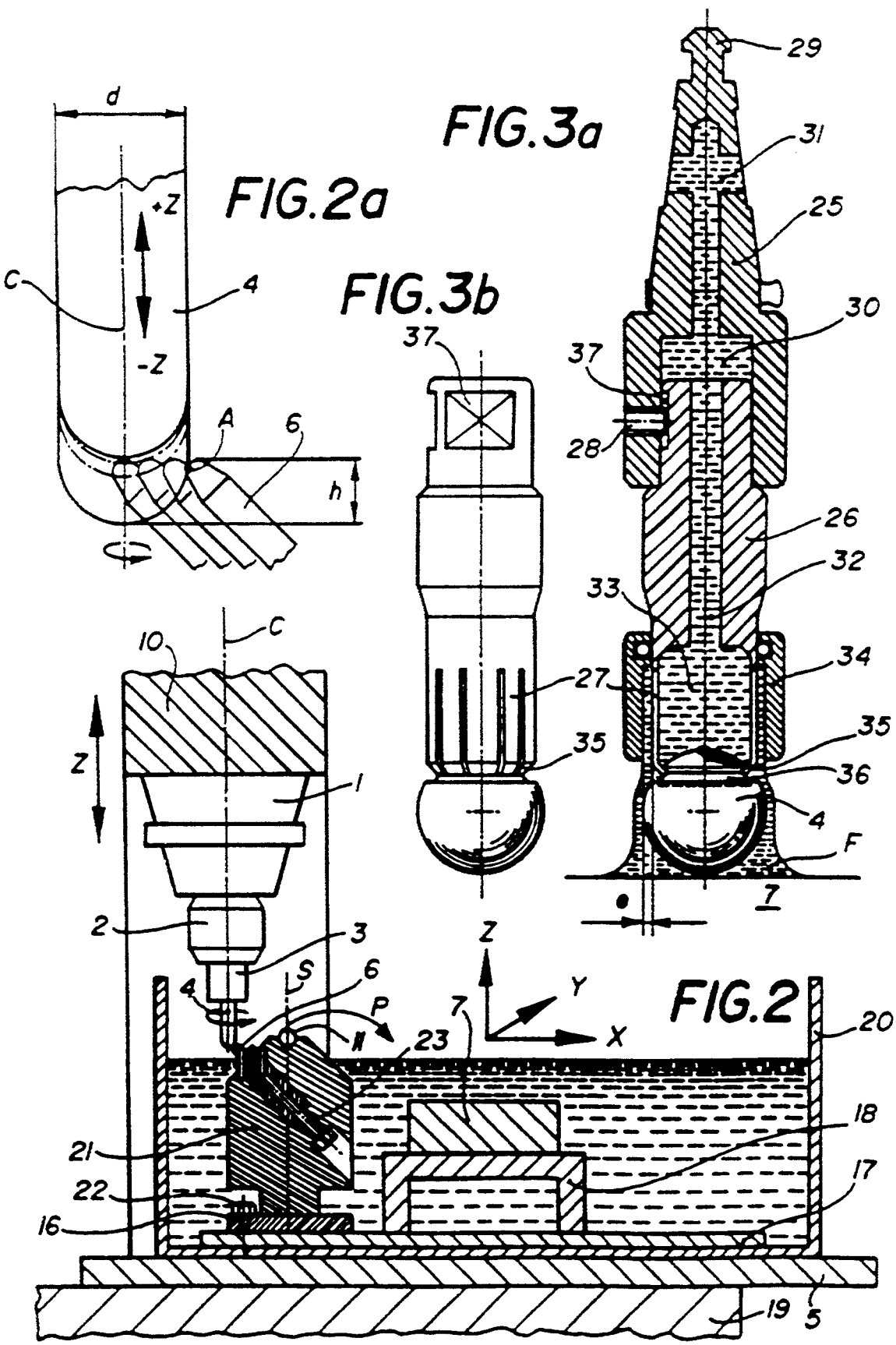

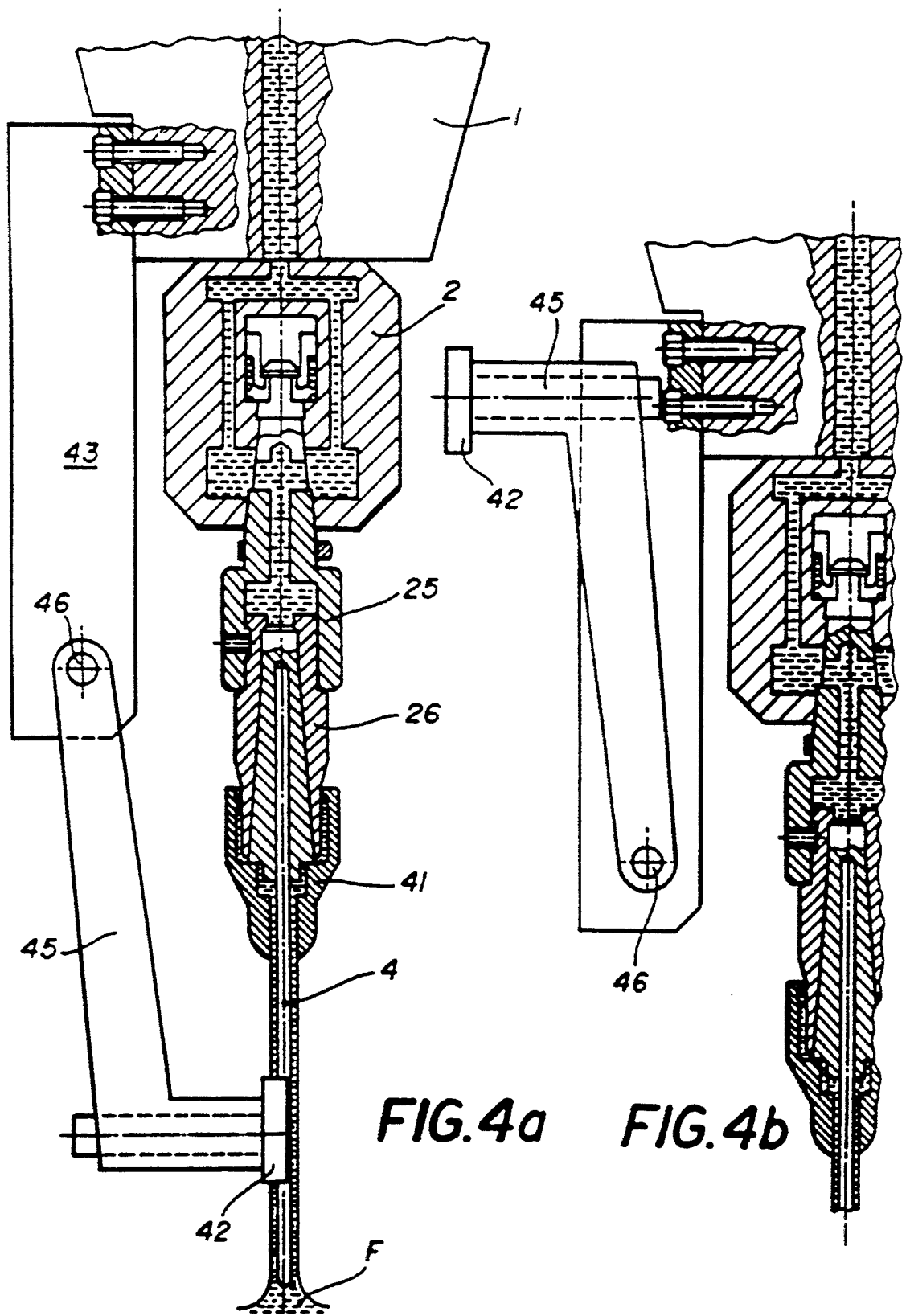

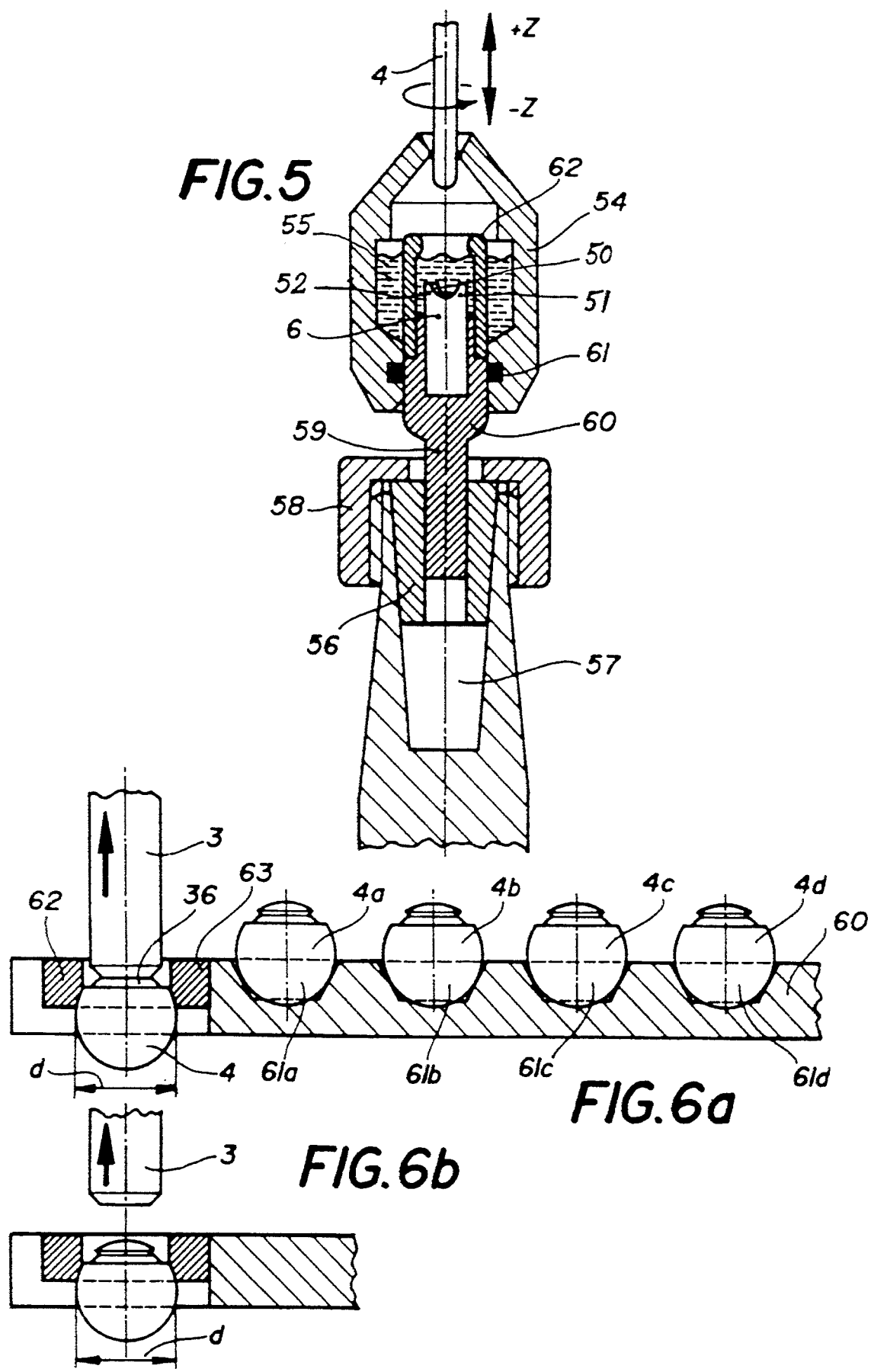

DEVICE, STANDARD BLANKS AND STANDARDIZED ELECTRODES FOR ELECTRO-DISCHARGE MILLING

The invention concerns a device enabling tool-electrodes to be directly machined on an EDM die sinking or milling machine, and immediately used in EDM without removing them from the machining head on which they were fitted to produce them. This device also enables the active part of the tool-electrode to be touched up during the machining process, as soon as said tool presents a given degree of wear. This means that standard blank electrodes can be used (i.e. commercially available), mass produced without a great degree of dimensional precision, shaped as solids of revolution (with axial symmetry, for example), such as tubes, cylinders or balls. It is even possible to manufacture tool-electrodes with standardised dimensions on a mass production line basis, and to use them on a EDM milling machine while touching them up from time to time during machining. These standardised electrodes will normally have simple shapes, i.e. they will be in the form of balls or cylinders, or cylinders with an hemispherical end, but any solid of revolution can be considered. This invention also concerns such standard blanks or standardised tool-electrodes, intended for use with the device defined by this invention, as well as the use of this device and these blanks and tool-electrodes on an electro-discharge milling machine.

Traditionally, the tool-electrodes for EDM dye sinking are made to measure for each particular application. However, devices enabling a touching up of the tool-electrode on the actual electro-discharge machine already exist.

This mainly consists in a refreshment by EDM cutting with a wire-electrode, as described in the Japanese patent pending published as number 57-194828, according to which the wire guides and wire supply components are attached to the machining tank they therefore move at the same time as the part to be machined, and the wire guides do not move with respect to the machining tank. The tool-electrode can only be cut along a plane which is parallel to the X and Y axes of the device which moves the tank (and the part being machined, and the cutting wire), with respect to the tool. The same type of refreshment with a wire-electrode is carried out with the devices described in Japanese patents pending published as numbers 61-159330, 61-159331, 61-159332 and 61-159333, and in European patent pending published as number 217 188, or in patent CH 659.605. However, they do enable the wire-electrode to be tilted in such a way as to cut the tool so that it is not parallel to the XY plane. We should also add the device described in patent pending EP 295.206, in which it is the tool to be rectified that is tilted and orientated as required, and in which the rectifying tool does not move.

We should also mention U.S. Pat. No. 4,754,115, which describes an EDM machine equipped with two mobile working tables, one used for EDM die sinking, and the other used to rectify a vertically moving graphite electrode either by USM (ultrasonic machining) or by TFM (total form machining). Although the cost and complexity of most of these devices is justified by the cost and times (drawing and machining) necessary to produce the shaped electrodes required for die sinking, they are not justifiable for EDM milling, for which only simple shaped electrodes are required.

Furthermore, the refreshment of the tool-electrode during machining has become essential in EDM milling, as this technique produces a certain amount of wear on the tool—EDM milling is usually carried out at high speed, i.e. by adjusting the machining speed in order to obtain a maximum amount of material removal. Indeed, as the cost of milling tool-electrodes is negligible with respect to that of shaped electrodes used in standard die sinking, it is no longer economically advantageous to carry out machining at what is known as "zero wear" speed, which actually corresponds to the minimum wear of the tool-electrode (and also slower erosion of the part to be machined). It had therefore become necessary to counteract the rapid wear of the tool-electrode.

The purpose of this invention is therefore to design a device which will enable the milling tool electrode to be refreshed or replaced quickly, if possible inexpensively, and most of all accurately, i.e. machining the eroded mark in compliance with the required profile, and that means will be therefore necessary to accurately locate and set the active surface of the electrodes with respect to the reference coordinates of the EDM machine, as well as a device to change the tool during machining without scarring the surface of the part being machined, and without reducing its precision. It is therefore particularly necessary to fit a device making it possible to:

manufacture a tool-electrode already "set in position", i.e. to machine it directly on the EDM machine on which it is to be used, without having to dismount it from the spindle of the machine, this for any required shape of said tool and without the need for a complex and costly mechanism or software device, and move the new tool to the EDM machining station where it is used for milling or die sinking, still without removing it from the manufacturing spindle for reinstalling it on a machining spindle.

Another objective is to use the same processes and devices to touch up or refresh the electrode during actual machining.

A third objective is to enable the same processes and devices to carry out milling with standard, mass produced tool-electrodes, refreshing or changing them as necessary, automatically, during the machining process.

Furthermore, the fittings of this invention have to be fairly simple in order to enable it to be mounted on a standard EDM machine, in order to obtain an electrode which is perfectly centered on the machining head, which has precise dimensions, and with a minimum cost.

The device, the standard blank electrodes and standardised tool-electrodes defined by this invention are defined in claims 1 and 18.

As mentioned above, the part secured onto the tool holder of the device defined by this invention is either a standard blank electrode, or an electrode with standardised dimensions, manufactured on a production line basis using machine-tools of a known type, such as cutting-off lathes for example. The precision of such a mass produced part can be as high as 4 microns. It will normally be of a simple shape (spherical, cylindrical or tubular) and will be made of materials such as graphite, electrolytic copper or cupro-tungsten, for example. The parts shall be solids of revolution terminated by a straight section or by a portion of a sphere, a cone, a portion of a cone, or a volume generated by the revolution of a given curve around an axis (as shown in FIG. 1, for example). They are provided with various grooves, threads or recesses, which may be produced during manufacture, or cut by the auxiliary tool of the device defined by this invention, in order to facilitate or enable their attachment to the tool-holder of the device, and may also have ducts, grooves or slits for channelling cooling liquid.

The tool-holder may be equipped with an annular injector, enabling to create a film of machining fluid around the tool-electrode; the type of this injector has be as described in patent pending CH 1128/89. It would, for example, dogs or a "Schäublin" type nose-grip which fit into recesses or grooves cut in the blank or tool-electrode. These grooves, as well as the ducts (for cooling fluid circulation) cut inside or on the surface of this blank electrode or tool-electrode, may be produced by any known means before installation on the tool-holder, or can be produced by the auxiliary tool after installation.

The means of attachment of the electrode on the tool-holder shall preferably be configured to enable the blank or tool-electrode to be self-centered. Furthermore, it is advantageous to provide for automatic fitting and unlocking of the tool-electrode or the blank. Finally, the tool-holder will often comprise a component enabling it to be adapted to several different sizes of tool-electrode or blank, as is the case of the tool-holder described in relation with FIG. 3.

The auxiliary tool is fixed, and it is the blank or the tool-electrode that moves vertically and rotates about its own axis; rotation is usually at a high speed, i.e. several thousand rpm. (However, as the tool is mounted on the work table, it may move at the same time as said table, for example in a horizontal plane). The auxiliary tool may, for example, consist of a grinding wheel, a chisel, a drill-bit, a set of one or several cutter blades, or a horizontal wire-electrode. It is particularly advantageous to use a tool which exerts a symmetrical strain on the blank electrode or tool electrode, for example the "cutter with constant profile" described in reference to FIG. 5. It is usually fitted to a base, secured near to one of the walls of the working tank of the EDM machine.

The magazine containing the blank or tool-electrodes is generally located in or near the working tank of the EDM machine. It will preferably have an appropriate distributor or loader, designed to offer a blank or a tool-electrode as orienting it correctly so that it can be grasped automatically by the tool-holder. However, it would also be possible to provide, for example on the tool-holder itself, a component for orientating the blank or the tool-electrode so that it can be grasped automatically by the tool-holder. This component can be of any known type, such as a magnetic unit for example, which acts on a corresponding element located on the parts stored in the magazine.

Finally, an unit is provided for removing, generally without operator assistance, the tool-electrodes which are excessively worn and can no longer be touched up. Said unit may be located above a collector recipient, but it may be advantageous to simply allow the worn electrode to drop into the working tank, where it can be recovered when the machine is cleaned. It is also possible to use a device designed to evacuate said worn electrode outside the machining area. Such a device could, for example, be fitted to the machining head or to an independent mobile element, equipped with a magnet for example. It may be advantageous, for example, to provide a double-bottomed tilting receptacle as described in FIG. 7 of patent pending EP 267.151, but fixed to the column or the frame of the machine. It may also consist of a receptacle attached to one of the walls of the working tank, appropriately shaped to protect the components inside said tank (for example, a recipient of any given shape and size, adapted to the quantity and dimensions of the electrodes), or of a net (stainless steel grid, for example) attached to the rim of the tank. The receptacle may also evacuate automatically from the tank all the scraps it contains after a predetermined number of ejections. It may also be sufficiently large to contain all the scraps produced during a machining cycle. It can so present means to evenly distribute the scraps.

In the text that follows, the invention is exposed in greater detail by reference to the drawings in appendix, which show only a few of the many embodiments of the device defined by this invention.

FIGS. 1a–1m shows various profiles for standard blanks or standarised tool-electrodes used with the device of this invention;

FIG. 2 is a global view of an EDM milling machine on which the device defined by this invention is fitted;

FIG. 2a is a view of the touching up of the hemispherical end of the electrode by the auxiliary tool;

FIG. 3a is a view of a standardized electrode;

FIG. 3b is a view of the standardized electrode mounted within a tool holder;

Figure 2B:
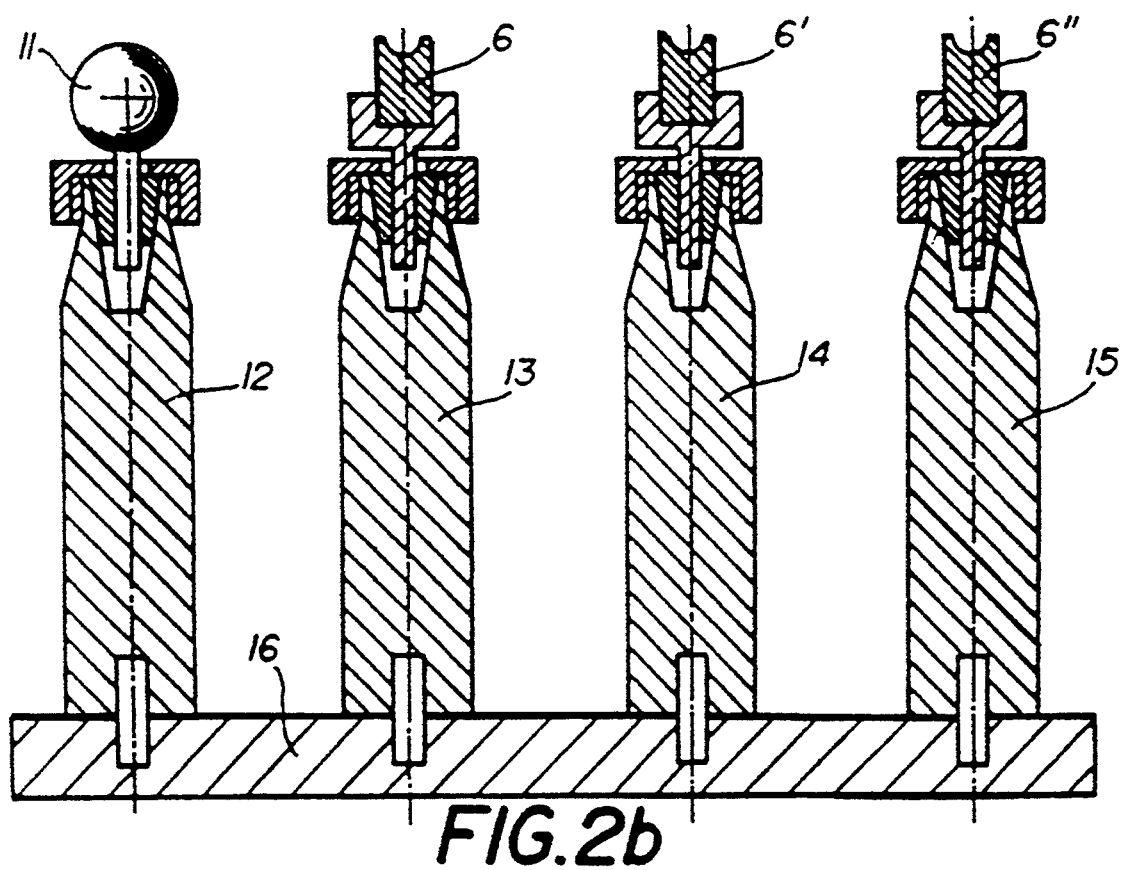
FIG. 2b is a view of four tool holders each fitted with a specially configured auxiliary tool.

FIGS. 4a and 4b each show the modes of execution of a tool-holder according to this invention, designed to hold a long, thin electrode (with a diameter of approximately 1 mm);

FIG. 5 is a schematic representation of a mode of execution for the auxiliary tool, designed to manufacture and/or touch up a cylindrical electrode terminated by a hemisphere, a cone, or any other profile of revolution;

FIGS. 6a and 6b and FIGS. 7a and 7b illustrate two possible variants of magazines suitable for standarised spherical electrodes and for the tool-holder in FIG. 3.

It should be recalled that standard EDM die sinking machines are fitted with components which enable the work table to move with respect to the tool along three orthogonal axes X, Y and Z, and the tool to rotate about its axis. Where these machines comprise a fast turning spindle capable of driving the tool at speeds of several thousand rpm, as described in patent pending CH 1128/89, they are also capable of providing an EDM milling function, i.e. machining a large volume of material, possibly with a complex shape, using small electrodes which are normally of a simple shape. Some such machines can be equipped with a rotating spindle capable of pivoting the tool with respect to the vertical axis (as described in patent pending CH 1378/89). This increases the capabilities for the manufacture or touching up of standarised electrodes.

The relative movements between a) the machining head fitted with a rotating spindle on which a tool-holder according to the present invention is fitted and b) the auxiliary tool according to the present invention or the workpiece to be machined by EDM milling, or a magazine containing standarised electrodes or standard blanks, are achieved using components and software which are already integrated into the EDM machine. The numerical control of the machine can, in particular, be connected to a CAD system used to define the shape of the recess to be milled, and to software defining the path to be followed by the tool-electrode.

Thus, as illustrated in FIG. 2, the Z-axis of a standard die sinking machine enables a precise vertical movement of a machining head (1), fitted with a rotating spindle (2) to which a tool holder (3) is locked and contains a blank or tool-electrode (4). This movement is controlled by the progress of the material removal which creates the recess. A cross-slides table (5) (which moves along orthogonal X and Y axes parallel to the working plane), can bring either the auxiliary tool (6) or the workpiece (7) to be machined beneath the blank or tool-electrode (4). The column (10) actually comprises various systems which are not shown in the drawing (servo-mechanism operated by the numerical control, electronic stop, component as defined in patent pending CH 4142/88 preventing the head from moving up beyond a position in which the tool-electrode is no longer immersed in the machining fluid, for example), and which accurately monitor the vertical position of the machining head (1).

The numerical control, also connected to two servo-actuators which control the table (5) and to an electrical pulse generator, is well known to persons skilled in art, as is the generator. These components are therefore not shown in the drawing, and are not described in the text that follows. Said numerical control system can include circuits which are programmed to record the position coordinates of the blank or tool-electrode (4). A working tank (20) is fixed to the table (5), and moves with the latter which is supported by the frame (19). This frame contains the tank for the dielectric liquid which constitutes the machining fluid, the filters, the pumps and any other components of the dielectric liquid supply and evacuation system; all these components are well known in the art and are therefore not shown.

A work table (17), and parts (18) for setting the workpiece (7) to be machined, are fixed to the base of this tank (20). Said tank is equipped with various solenoid valves for filling, injection, suction or evacuation of the dielectric, as well as with thermostats, and devices enabling the dielectric level to be adjusted; all these components are of a known type, and none are shown.

A plate (16) is mounted on the work table (17); it may comprise one or several tool-holders (in the example shown in FIG. 2B, there are four such tool-holders marked 12 to 15), fitted with at least one auxiliary tool (6) it also comprises a support for a reference sphere (11) used to record, through an electrical touch circuitry, the exact position of the blank or tool-electrode (4)—the operation of this function will be explained later. A chisel-holder (21) is shown schematically in the cross-section of FIG. 2 and is solidly attached to the plate (16) by three screws (22) (only one screw is shown).

The auxiliary tool (6) is a chisel fitted at an angle to the axis of this chisel-holder (21), the oblique position being obtained through screw (23). The sphere (11) is not mounted on a separate column, as shown in FIG. 2B, but directly on said chisel-holder (21).

We will now describe the operation of a device according to the present invention, diagrammatically shown in FIG. 2, from the moment when the tool-holder (3) has just clasped a cylindrical blank electrode (4) from which a hemispherical tip is to be produced. We will assume that the diameter of said blank is equal to that required for the final hemispherically-tipped electrode. The numerical control orders certain movements to head (1) and table (5) along the X, Y and Z axes, in order to center the axis (C) of the blank (4) with respect to the axis (S) of the chisel-holder (21); this is achieved in a known manner, thanks to four crossed contacts between the reference sphere (11) and the blank (4). The numerical control then orders the blank (4) to move down until it just touches the sphere (11) by electrical touch, at reference point "P", followed by a relative displacement along the three axes X, Y and Z in order to bring the tip of the chisel (6) into contact with the blank (4) at a point located at the height of the end of the required hemisphere (point A, FIG. 2a) or above this point, i.e. at a point located at a distance of at least "h" from the end of the blank (4) ("h" being equal to half of the diameter "d" of the blank electrode) (see FIG. 2a). This is a simple task, as the coordinates of the tip of the chisel (6) are pre-recorded in the numerical control, as are those of datum point "P". It is then merely necessary to start the spindle (2) to rotate and to move upwards the head (1), whilst simultaneously moving the table (5) according to translations programmed so that the tip of the chisel (6) moves towards axis (C) of the blank (4), cutting the latter to the required profile (a hemisphere in this example). The table (5) is normally moved along only one of the horizontal axes (X or Y). By modifying the program, it would be possible to shape the tip of the blank according to other profiles, such as a cone for example; however, the profile created can only be one with a symmetry of revolution around axis (C) of the blank electrode (which will subsequently be the rotation axis of the tool-electrode produced).

A similar method is used to touch up a worn tool-electrode (4). At each touching up operation, the electrode (4) will obviously be shortened by a length Dx. This must be taken into account by the numerical control, so that machining can be resumed using an electrode tool whose active surface occupies a position which is identical to the original position prior to the touching up, and which has been stored in the memory of the numerical control system.

This is easy to achieve: it is merely necessary to bring the end of the touched up electrode back into contact with sphere (11). The difference between the vertical elevation of the head (1), before and after the touching up, corresponds to the value of Dx. The numerical control has a set of appropriate programs, enabling it to continue machining after decrementing the Z-coordinates of head (1) by the value of Dx after each touching up operation. In this way, the shortening of electrode (4) due to wear is automatically compensated.

FIG. 3 shows one of the possible embodiments for a tool-holder (3) according to the present invention, designed to grasp any volume of revolution with a groove. In this example, this volume is a standardised electrode (4) as defined by this invention, with the shape of a sphere having a circular groove of appropriate profile.

This tool-holder (3) consists of two elements: a fastening component (25) and a body (26) which ends into a grip (27) designed to hold a part (4) of a given diameter. Various bodies (26), comprising different sized grips, can be successively installed in the same component (25) by means of screws (28) which fit into appropriate recesses (37) cut in the body (26).

In this example, the fastening of the tool-holder in the rotating spindle (not shown) is achieved owing to an automatic locking system as described in patent CH 1128/89. The fastening component (25) is ended by a protruding section comprising a rectangular flare (29), whose dimensions (as measured in a plane perpendicular to the symmetry axis of the tool-holder) are slightly smaller than the dimensions of a slot cut in the end of a puller piston, fitted coaxially into the rotating spindle and operated from the top by a spring. By turning the tool-holder through a quarter turn, this flare (29) is retained by the bottom of the puller piston. Fastening and unlocking of the tool-holder (3) from the rotating spindle can be carried out automatically. For example, locking can be obtained by immobilizing the tool-holder in a rack opposite the slot in the puller piston. It is merely necessary to lower the machining head along the Z-axis, order the spindle to turn through a quarter of a turn, and then move it up again along the Z-axis. To unlock the tool-holder, a pressurized fluid (oil or compressed air, for example) is injected in order to press the puller piston back downwards; by reversing the operation described above, and turning the tool holder through a quarter of a turn, it is possible to release it from the spindle. However, other fastening systems can be considered. The machining current is conveyed to the tool-electrode (4) through the spindle (2) and the tool-holder (3), which explains the need for efficient cooling of the spindle/tool-holder assembly (see FIG. 3).

A cylindrical bore determines in the fastening component (25) an injection chamber (30) which is supplied from the rotating spindle through radial ducts (31), which communicate through central duct (32) with a chamber (33) ended by the grip (27). The grip (27) is drilled with radial grooves, to allow the pressurized liquid to flow to the internal surface of an annular injector (34), and then along the blank or tool-electrode (4). The injector (34) is profiled in such a way as to leave a space between its wall opposite the grip (27) and the surface of the latter. This space is determined according to the geometry of the tooling and the viscosity and injection pressure of the cooling liquid, in such a way that a film of liquid F surrounds the blank or tool-electrode (4).

Body units (26) with different diameters and profiles can be provided, in order to fasten parts (4) of different shapes and weights, without having to use a different fastening component (25).

The fastening of a spherical blank or tool-electrode (4) into the body (26) is carried out very simply, so long as the sphere (4) is orientated with its groove (36) positioned horizontally the sphere (4) to be gripped is centered with respect to the tool-holder, and the dogs (35) of the spring grip (27) are brought into contact with the sphere (4). The dogs (35) fit into the groove (36) by simply pressing the sphere (4) home.

To release said sphere (4), one need only to maintain it by locating it beneath a sort of fork or rack with a gap smaller than the diameter of said sphere (4), and then to raise the machining head in order to "pull" it out.

The groove (36) is profiled in such a way as to be self-centering: to mount the sphere (4), it is no more essential to center it accurately with respect to the tool-holder, nor to accurately orientate its groove in the horizontal plane. When the plane of the groove (36) is horizontal, one of its edges is also horizontal, whilst the other is oblique.

Using a variant (not illustrated), a part used as a pusher can be coaxially introduced into the duct (32) in order to press out the electrode (4) and facilitate its dismounting. This pusher can be operated by any known means (electrical, pneumatic, hydraulic, mechanical), and should preferably be numerically controlled. It can be hollow and drilled with orifices at its bottom end, in order to connect injection chambers (30) and (33) together.

According to another variant, the dismounting of the electrode (4) (which can be spherical or of any other shape) could be made easier by the use of a second groove or orifice, into which a component could be inserted in order to immobilize it while the machining head rises in order to dismount the tool-holder.

Many variants other than the dog-groove fastening system of this example can be considered: systems with at least three oblique recesses and corresponding dogs, screws and nuts, suction of the electrode (4) by a duct connected to a vacuum pump, balls entering a groove and capable of being released by hydraulic or pneumatic pressure (fastening using locking balls and bushes), tapered shaft driven into a corresponding conical recess. However, the solution illustrated in FIG. 3 is the least costly defined to date.

FIG. 4 represents another type of tool-holder, for a device according to this invention, designed to support a long, thin electrode, either during manufacture in the case of a blank electrode, or during touching up in the case of a tool-electrode. "Fine" means electrodes shaped as solids of revolution with a diameter of approximately one millimeter.

As electro-discharge machining does not subject the tool to high stresses, this support is not necessary during EDM processing. It is for this reason that the component provided to support the electrode during manufacture and/or touching up should preferably be removable.

The actual tool-holder is, for example, as described in patent pending CH 1128/89, where the electrode (4) is held by a "Schäublin" type grip (40), inserted in a bore of the tool-holder. An annular injector (41) can be provided in order to produce a film (F) of cooling liquid around the electrode (4), both during turning by the auxiliary tool and during the actual EDM machining.

The tool-holder can be made up, as described above, by a fastening component (25) fixed to the rotating spindle, to hold its body (26). Logically, the other components in common with those of the tool-holder illustrated in FIG. 3 are referenced by the same numbers.

The electrode (4) is a cylindrical graphite rod, with a diameter of less than 1 mm. It is supported by a support (42), connected by an arm to the machining head (1) (to which the rotating spindle (2) is also connected). This arm comprises two articulated parts (43) and (45). Part (43) remains fixed, and part (45) is retractable (see FIG. 4b) and can move around the pivot (46) by a half-turn.

The work and rest positions of this support (42) are illustrated in FIGS. 4a and 4b. This support is operated by any known means (electrical, pneumatic or hydraulic).

According to certain variants, it is possible to adjust its height in order to adapt it to electrodes (4) of different heights (known differential system—not illustrated).

FIG. 5 shows one of the preferred embodiments of the auxiliary tool (6) according to the device of this invention. It is a "cutter with constant profile", whose principle is well known in the art. Contrarily to the device comprising a chisel in FIG. 2, it is no longer necessary to move the auxiliary tool horizontally in order to touch up the tip of the electrode according to a given profile, and to programme this movement simultaneously to the vertical displacement of the electrode, in order to coordinate both motions, so as to obtain the required profile. In this case, it is merely necessary to move the electrode vertically during manufacture or touching up—the profile of the three cutter blades (50), (51) and (52) produces the required profile. To change the profile, it is necessary to change the auxiliary tool.

Tool (6) shown in the drawing has three cutter blades, but it could have more. One advantage of these tools with at least three blades, symmetrically located around an axis (which is combined with the symmetry axis of the part to be turned) is that the stresses are spread equally around the rotation axis of the blank electrode or tool-electrode (4), whereas a single tool such as the chisel in FIG. 2 would only apply stress to one side. The advantage is that the straightness of the obtained part (4) is perfect. This tool (6) is mounted in a fluid-tight cup (54) containing cutting oil (EDM machining fluid is not a good cutting oil). Stirring is ensured by the rotation of part (4). The oil (55) enables scrap to be eliminated. The operator can, for example, remove this cup (54) once a day in order to renew the oil.

The cup (54) is supported by a grip (56), which is itself pressed into a cone (57) by a nut (58), so that it clamps a rod (59) of the tool-holder (60), onto which said cup (54) is fitted, owing to a seal (61)). The tool-holder (60) is fitted with an insulating ring (62), which acts as a guide in order to support the part (4), in the case of vibrations, for example. It is made of insulating material (DELRIN or ceramic, for example), otherwise it would operate the electrical touch when the head of the blank or tool-electrode (4) passes in front of it, as it moves towards the cutter blade (6).

Indeed, it should be recalled that an "electrical touch" device, well known in the art and therefore not illustrated here, is connected to the cutter blade (6).

When the part (4) moves down towards said tool (6) with the machining head, along the vertical Z-axis, as soon as said metallic part (4) comes within a certain limit distance of the cutter blade (within 3 microns, in this example), an electrical current occurs in a calibrated circuit and causes said vertical movement to stop, the elevation of part (4) to be recorded, the electrical touch to be locked, and the initiation of a program which controls the rotation of part (4) and its descent along the Z-axis, at a set speed and for a set distance. The calibration of the electrical touch takes many factors into account, including the material of which the blade is made, its extent of oxidation, and the humidity of the air.

Many systems can be considered for the magazines containing the standard blank electrodes or standardized tool-electrodes defined by this invention. In the text that follows, only two examples related to the spherical parts defined and illustrated by FIG. 3 will be described.

FIG. 6 illustrates the first of these variants: a display unit (60) is secured by any known means (not shown) onto one of the walls of the working tank (20) (see FIG. 2), at approximately the same height as the clamping table (18); it therefore moves at the same time as the cross-slide table (5). It has four tronconical recesses (61a to 61d), with smaller diameters than those of the spheres 4a to 4d to be stored. The relative movements of the table (5) with respect to the machining head (1) will therefore enable the tool-holder (3) to be automatically brought near to the display unit (60), opposite the sphere to be grasped. The positions, i.e. the coordinates of the symmetry axes of these recesses (61), in other words the coordinates of the spheres (4) that they support, are stored in the numerical control working memory.

Furthermore, a pulling up unit is provided at the end of the display unit (60). It consists of a fork with two horizontal teeth (62) and (63), between which the tool-holder (3) is able to slide; the distance between the horizontal teeth (62) and (63) is slightly greater than the tip of said tool-holder (3), which grips the spherical electrode (4), but slightly less than the diameter of said sphere (4). The operation of this unit is extremely simple: the elevation of the machining head is adjusted in such a way that the circular groove (36) of the sphere (4) is slightly above these teeth, and that the diameter (d) of this sphere is located below (see FIG. 6a). One need only to move the head in a direction parallel to these teeth, and then to raise it until the sphere (4) is stopped by said teeth; the tool-holder (3) continues to rise, which slackens the dogs (35) and releases the sphere (4) (FIG. 6b).

In certain variants, this pulling up unit can obviously be separate from the actual display unit (60). In other variants, display unit (60) can be mobile, enabling each of the recesses (61) to be successively moved to a predetermined datum point. This point will correspond to a datum position of the machining head, from which it will be moved downwards in order to grasp a new part (4) with the tool-holder.

FIG. 7 shows a second type of magazine for storing standard blank electrodes or standardized tool electrodes, which can be advantageously used on the devices defined by this invention. It comprises a chamber (70) containing loose spheres (4), with their grooves (36) orientated randomly. An inclined surface (71) leads to a chamber (72), whose dimensions are such that it can contain only one sphere (4).

Due to this configuration, only one sphere (4) is ever located above tube (74), which has an alternating movement. This is because tube (74) is actuated between the positions described in FIGS. 7a and 7b, which means that the forward movement brings a sphere (4) from chamber (72) to annular chamber (78). The sphere is held in suspension above funnel (75) ending said tube (74), by a cushion of air (80) created by the pressurized air ejected by a circular orifice (76) connected to the injection chamber (77). This air bearing enables the sphere to be supported without friction.

Figures 7A, 7B:
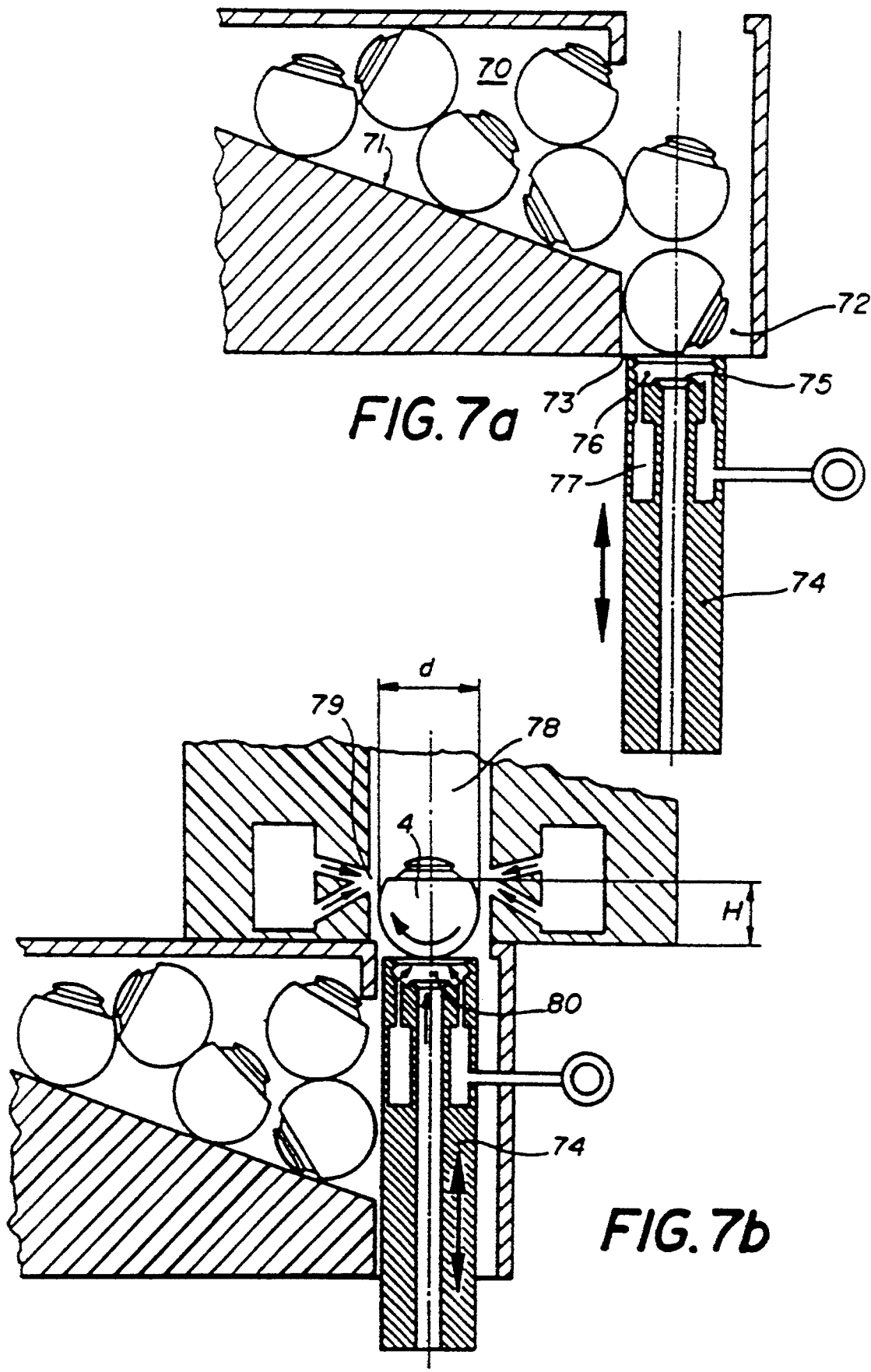

Chamber (78) is drilled with orifices (79), located at a height "H" which is slightly lower than the distance between the groove and the point on sphere (4) furthest from the groove (or with a single circular orifice in the case of one of the variants). Air under pressure is ejected by these orifices. The effect of this is to "stand up" the sphere by bringing its groove (36) into a horizontal plane. The position of the sphere (4) in FIG. 7b is a datum position, stored in the working memory of the numerical control unit of the EDM machine. Said unit automatically controls the centering of the machining head above this position, and its vertical downward movement in order to engage the dogs of the tool-holder in the groove of the sphere.

The advantages brought about by this invention are numerous. It is indeed easier and faster to produce and/or touch up a tool-electrode directly on the machine on which it is used. This avoids many fastening and dismounting operations, and not only does this save time, but it also makes for increased accuracy and/or a further degree of automation, since the datum positions are retained, and since this avoids any possible eccentricity due to the dismounting of the tool from the manufacturing or touching up spindle, and its resetting on the machining head of an EDM machine.

Most of all, it is possible to standardize the manufacture of these disposable electrodes on the basis of standard (and low cost) shapes, and to touch up or change worn electrodes as and when required during a machining operation. It is possible to work from very simple blank electrodes, shaped as solids of revolution and to cut therein, when needed, grooves, recesses or ducts to enable them to be cooled by the machining fluid and/or facilitate their fastening on the tool-holder, and possibly to turn them before use, in order to provide them with the required active profile. The required profile can be recorded in the working memory of the numerical control, and automatically created or regenerated as required, on the successive blank electrodes or tool-electrodes stored in a magazine, possibly equipped with an appropriate loader. During machining, the replacement of an excessively worn electrode that can no longer be touched up, is automatic and quick.

The savings brought about in that manner, are considerable, and are added to the saving in space and equipment brought about by the use of the same precision equipment, the same numerical control and the same software both for EDM processing and for the manufacture and/or touching up of the electrodes used in the machining process. One need only to add an auxiliary tool (and possibly a loader) that can be operated by the numerical control of the machine, and to provide the latter with the necessary software and circuits. It is therefore very simple to equip an existing machine with this device. We should add that the automatic renewal of the worn active part of the electrode makes it possible to carry out machining with electrodes that are much smaller than the volume of material to be eroded, and which are therefore much lighter than standard electrodes for die sinking, whence the possibility of building an EDM milling machine with a lighter mechanical system than that used by standard die sinking machines.

Thanks to the device defined by this invention, it is therefore possible to mill a recess of any size and profile (provided that it can be broken down into a combination of simple volumes), with an accuracy that can be even greater than that obtained by standard die sinking. Today, it is possible to describe a complex shape as a series of simple elementary shapes, using known CAD (Computer Aided Design) systems. The profile of these simple volumes can be sent to the numerical control of the EDM machine, and stored in its working memory in order to touch up or even turn the corresponding elementary electrodes corresponding to the simple volumes required. By working in this "self-sufficient" manner, the EDM milling machine could become a true "intelligent" machine.

I claim:

1. A device for EDM die sinking and milling machines for turning and touching up a tool-electrode during machining of a workpiece and without having to dismount the tool-electrode from a machining head of an EDM machine, the machining head being movable vertically and has a spindle which rotates about an axis, said device comprising:
   a tool-holder mounted on the machining head, said tool-holder having means for fastening the tool-electrode when turning and touching up the tool-electrode;
   a working tank in which is mounted the workpiece;
   an auxiliary tool holder mounted on the working tank and an auxiliary tool mounted in the auxiliary tool holder, the auxiliary tool is shaped to accurately machine and touch up an active tip of the tool-electrode;
   a numerical control unit for accurately locating and positioning the active tip of the tool-electrode for touching up by said auxiliary tool and for resumption of EDM machining of the workpiece after touching up by said auxiliary tool; and
   a sensor mounted to said auxiliary tool holder, said numerical control unit responding to an electrical contact between the tool-electrode and said sensor to displace the tool-electrode to a position at which it is machined by said auxiliary tool.

2. The device according to claim 1, also comprising a magazine having a loader, said loader positioning the tool-electrode to be grasped automatically by said tool-holder.

3. The device according to claim 1, comprising said numerical control unit having means for memorizing a position of the active tip of the tool-electrode before touching it up so as to coordinate the movements of the machining head in order to restore said active tip to said position for machining after said touching up.

4. The device according to claim 1, further comprising said numerical control unit having means for coordinating the movements of the machining head and said auxiliary tool so said auxiliary tool accurately machines and touches up the active tip of the tool-electrode according to a predetermined dimensional profile.

5. The device according to claim 1, in which an end of said tool-holder consists of a clamp with dogs configured to fit into recesses on said tool-electrode.

6. The device according to claim 5, in which said tool-electrode is securable in said tool-holder by a simple press action.

7. The device according to claim 1, in which said auxiliary tool has several cutting edges arranged symmetrically around an axis which is parallel to that of said tool-electrode.

8. The device according to claim 7, in which said auxiliary tool is mounted inside an enclosure containing a machining fluid.

9. The device according to claim 7, in which said auxiliary tool has a support with an insulating part capable of guiding and supporting the tool-electrode while being machined by said auxiliary tool.

10. The device according to claim 1, in which said tool-holder comprises a removable support-piece to support said tool-electrode while being machined by said auxiliary tool, said support piece being fixed to the machining head for remaining steady while said spindle rotates.

11. The device according to claim 1, in which said electrical contact outputs a signal to said numerical control unit of the EDM machine, and in which said numerical control unit is programmed to stop the motion of said machining head when said signal is received, locate the position of the tool-electrode, move the tool-electrode to the position of said electrical contact, and trigger a program for turning and touching up of said tool-electrode.

12. The device according to claim 1, in which the tool-electrode is a blank electrode consisting of a solid of revolution and provided with a top part for cooperating with the fastening means of said tool-holder.

13. The device according to claim 12, in which said blank electrode consists of one of a group selected from a cylinder, a sphere, or a cylinder with a hemispherical or tapered end.

14. The device according to claim 1, in which the tool-electrode is a tool-electrode consisting of a solid of revolution and provided with a top part for cooperating with the fastening means of said tool-holder.

15. The device according to claim 14, in which said electrode consists of one of a group selected from a cylinder, a sphere, or a cylinder with a hemispherical or tapered end.

16. The device according to claim 14, in which said electrode has a circular groove in a plane which is perpendicular an axis of symmetry of said auxiliary tool.

17. The device according to claim 14, in which said electrode has a groove whose profile enables said electrode to be automatically centered on said tool-holder.

18. A device for EDM die sinking and milling machines for turning and touching up a tool-electrode without having to dismount the tool-electrode from a machining head of an EDM machine, the machining head being movable vertically and is provided with a spindle which rotates about an axis, said device comprising:

a tool-holder mounted on the machining head, said tool-holder having fastening means to fasten the tool-electrode when turning and touching it up during EDM machining;

a single working tank in which is mounted a workpiece and an auxiliary tool for accurately machining and touch up an active tip of the tool-electrode;

said auxiliary tool comprises an assembly of several mechanical tools mounted symmetrically around an axis of rotation of the spindle; and means for accurately locating and positioning the active tip of the tool-electrode for resumption of EDM machining after touching up by said auxiliary tool.

19. The device according to claim 18, said mechanical tools being affixed to a bottom of said working tank, said mechanical tools do not translate or rotate.

* * * * *

UNITED STATES PATENT AND TRADEMARK OFFICE
CERTIFICATE OF CORRECTION

PATENT NO. : 5,396,040

DATED : March 7, 1995

INVENTOR(S) : Roger Girardin

It is certified that error appears in the above-indentified patent and that said Letters Patent is hereby corrected as shown below:

Column 1, line 20, delete "a", insert --an--.

Column 1, line 24, delete "an", insert --a--.

Column 1, line 31, delete "dye", insert --die--.

Column 7, line 53, after "horizontally", insert --; the sphere (4) to be gripped is--.

Column 8, line 68, delete "contrarily", insert --contrary--.

Column 9, line 4, delete "programme", insert --program--.

Signed and Sealed this

Twenty-sixth Day of September, 1995

Attest:

BRUCE LEHMAN

Attesting Officer     Commissioner of Patents and Trademarks